(12) United States Patent
Wessels

(10) Patent No.: US 7,463,070 B2
(45) Date of Patent: Dec. 9, 2008

(54) SWITCHING DEVICE FOR DRIVING LED ARRAY BY PULSE-SHAPED CURRENT MODULATION

(75) Inventor: Johannes Hendrik Wessels, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 346 days.

(21) Appl. No.: 10/504,139

(22) PCT Filed: Feb. 6, 2003

(86) PCT No.: PCT/IB03/00418

§ 371 (c)(1),
(2), (4) Date: Aug. 10, 2004

(87) PCT Pub. No.: WO03/069958

PCT Pub. Date: Aug. 21, 2003

(65) Prior Publication Data

US 2005/0088209 A1 Apr. 28, 2005

(30) Foreign Application Priority Data

Feb. 14, 2002 (EP) .................................. 02075627

(51) Int. Cl.
*G01R 29/02* (2006.01)

(52) U.S. Cl. .............................. 327/36; 327/35; 327/39; 327/44; 327/50; 315/247; 315/209 R; 315/246

(58) Field of Classification Search ................... 327/36, 327/35, 39, 44, 46, 54, 50; 315/247, 246.209 R, 315/224, 225

See application file for complete search history.

(56) References Cited

U.S. PATENT DOCUMENTS

| 3,998,043 | A | * | 12/1976 | Tamaru et al. | ................. 368/66 |
| 5,736,881 | A | * | 4/1998 | Ortiz | ........................... 327/175 |
| 6,333,605 | B1 | * | 12/2001 | Grouev et al. | ................ 315/291 |
| 6,388,398 | B1 | * | 5/2002 | Li et al. | ....................... 315/307 |
| 6,580,309 | B2 | | 6/2003 | Jacobs et al. | |
| 6,686,703 | B2 | | 2/2004 | Erhardt et al. | |
| 6,836,079 | B2 | * | 12/2004 | Hong | .......................... 315/291 |
| 2003/0085749 | A1 | * | 5/2003 | Xu et al. | ...................... 327/423 |
| 2003/0127995 | A1 | * | 7/2003 | Kramer et al. | .............. 315/291 |

FOREIGN PATENT DOCUMENTS

| DE | 19732828 | 2/1999 |
| EP | 0553867 A2 | 8/1993 |
| EP | 0625843 A1 | 11/1994 |
| WO | WO9956303 | 11/1999 |
| WO | WO0020691 | 4/2000 |

* cited by examiner

*Primary Examiner*—Tuyet Vo

(57) ABSTRACT

A circuit drives an LED array and controls the brightness of the LED array by regulating the current flowing through the array. The LED array is driven by a pulse-shaped current of which the mean value is regulated with at least one or two of the following types of modulation: frequency modulation, pulse-width modulation, and amplitude modulation.

2 Claims, 1 Drawing Sheet

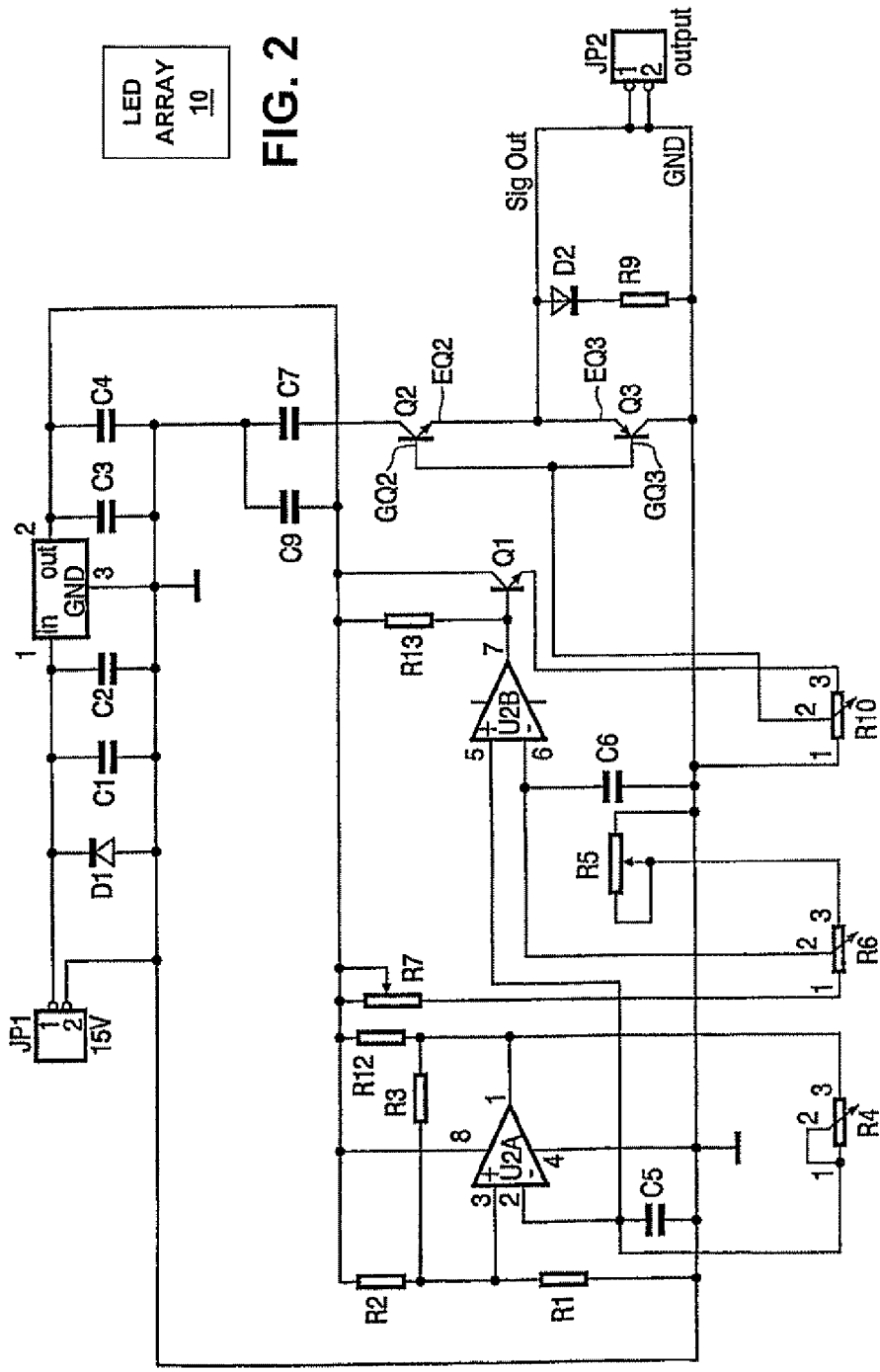

SWITCHING DEVICE FOR DRIVING LED ARRAY BY PULSE-SHAPED CURRENT MODULATION

The invention relates to a switching device for driving a LED array.

WO 0020691 has disclosed a LED array serving as road marking. The brightness of the relevant road marking as perceived by the traffic participant is considerably influenced by the local circumstances such as, for example, the time of day and prevailing weather conditions. On the one hand, the perceived brightness is to be sufficiently great for a proper observance of the marking and, on the other hand, this brightness should remain limited to avoid a traffic participant's attention being distracted too much from other observations which are of importance for safe traffic handling, or to avoid dazzling.

The invention provides a solution to the problem thus arisen. According to the invention, a switching device for driving a LED array is characterized in that the switching device comprises means for driving a LED array with a pulse-shaped current of mean strength and for regulating the mean strength of the current flowing through the LED array by means of at least one of the following types of modulation: frequency modulation, pulse-width modulation, and amplitude modulation of the pulse-shaped current. Regulation is preferably effected with a combination of two types of modulation of the pulse-shaped current.

Since light generation of a LED is dependent on the current strength through the LED, pulse-shaped current regulation is highly advantageous because pulse-shaped regulation can be realized by modern electronic power supply circuits in a relatively simple way. By combining at least two kinds of modulation of the current flowing through the LED, an extraordinarily wide control range for the mean current strength is realized. In consequence, the brightness of the marking formed by the LED array can be adapted well to the locally prevailing circumstances, which circumstances may be subject to major changes. The control range may be advantageously increased by a combination of the three types of modulation.

A suitable form of controlling the brightness through regulation of the average or mean current (having a strength or level referred to as Inom) flowing through the LED array is based on a regulation by means of pulse-width modulation for a current strength in a range between the mean nominal current level Inom and 0.05 Inom, with amplitude modulation superimposed thereon so as to regulate the mean current strength Inom in a range from 0.05 Inom to $0.05*10^{-3}$ Inom.

The invention will be further explained with reference to a drawing of an embodiment of a switching device according to the invention illustrated in FIG. 1, and a drawing of a block diagram of a LED array illustrated in FIG. 2.

The switching device as shown in FIG. 1 has an input JP1 for connection to a supply source. The general property of LEDs that there is only a small forward voltage across the LED in operating condition means that a low-voltage supply source may be used. An output JP2 is suitable for connecting the LED array to be operated, such as for example an LED array 10 shown in FIG. 2 consisting of two or more LEDS arranged in series and/or in parallel as known in the art. For a simple verification of the operation of the switching device, a series combination of a LED D2 and a resistor R9 is connected in parallel to the output.

A semiconductor switching element Q3 in parallel to the output and the series combination is present, a main electrode EQ3 of which element is connected to a main electrode EQ2 of a semiconductor switch Q2 which is connected between input and output. A control electrode GQ2 of semiconductor switch Q2 is connected to a control electrode GQ3 of the semiconductor switching element Q3 and to a shared control circuit.

The control electrodes GQ2 and GQ3 are connected to a center tap 2 of a potentiometer R10, which is connected in series with a transistor Q1. The position of the center tap 2 of the potentiometer R10 determines the degree of current conduction through the semiconductor switch Q2 and the semiconductor switching element Q3.

The series combination of potentiometer R10 and transistor Q1 constitutes an output of a pulse-width modulator formed around an opamp U2B. An output 7 of opamp U2B is connected to a base of transistor Q1. Input 5 of the opamp U2B is connected to a capacitor C5, which is part of an oscillator, and input 6 of opamp U2B is connected to a variable voltage divider R7, R6, R5. The time per cycle of the oscillator frequency during which the signal at output 7 turns transistor Q1 on or off respectively, can be varied by means of the variable voltage divider, so that the pulse width of the current pulse is varied by the semiconductor switch Q2.

Capacitor C5 and opamp U2A form part of an oscillation circuit in which the capacitor C5 together with impedances R4 and R12 constitutes a voltage divider circuit. R4 is herein an adjustable resistor, which achieves that the frequency generated by the oscillation circuit can be adjusted and can therefore be varied. In consequence, the current pulse frequency will vary accordingly.

In a practical realization, the opamps U2A and U2B are constituted by a single integrated circuit (IC) of the type TS393CN. Transistor Q1 is of the type BC548C, semiconductor switch Q2 of the type BC639, and semiconductor switching element Q3 of the type BC640. The oscillator circuit has a default frequency of 200 Hz. Potentiometer R10 has a strength of 4.7 kΩ and has a 100% control range. The switching device is intended to be connected to a 15V DC supply source. The switching device drives a LED array for road marking, which LED array comprises a total of 400 LEDs of the type Nichia NSPW300BS. In nominal condition the supply is effected such that the mean current flowing through each LED of the array is 20 mA. Brightness control down to a level corresponding to a mean current through each LED of 1 mA takes place exclusively by varying the voltage divider R7, R6, R5. The pulse width is then modulated to a 2% duty cycle. For further reduction of the brightness, the setting of the potentiometer R10 is varied. When the complete control range of the potentiometer R10 is utilized, the mean current flowing through each LED can be reduced to 1 μA.

The invention claimed is:

1. A switching device for driving an LED array, wherein the switching device comprises means for driving the LED array with a pulse-shaped current of mean strength and for regulating the mean strength of the pulse-shaped current flowing through the LED array by modulation means for modulating the pulse-shaped current with frequency modulation, pulse-width modulation, and amplitude modulation, wherein the mean strength has a nominal strength $I_{nom}$ and wherein, from $I_{nom}$ down to 0.05 $I_{nom}$, the mean strength is regulated by means of the pulse-width modulation, and for less than 0.05 $I_{nom}$, the mean strength is regulated by superimposing the pulse-width modulation on the amplitude modulation.

2. The switching device as claimed in claim 1, wherein for smaller than $0.05.10^{-3}$ $I_{nom}$, the mean strength is regulated by the frequency modulation.

* * * * *